US010060309B2

(12) United States Patent
Smies et al.

(10) Patent No.: US 10,060,309 B2
(45) Date of Patent: Aug. 28, 2018

(54) INTERNAL COMBUSTION ENGINE HAVING OIL BAFFLE

(71) Applicant: Kohler Co., Kohler, WI (US)

(72) Inventors: Michael E. Smies, Waldo, WI (US); Christopher D. Thorn, Belgium, WI (US); Brian Philipps, Kohler, WI (US); Louis G. Verhagen, Sheboygan, WI (US); Nick Bille, Sheboygan Falls, WI (US); Advait S. Vaidya, Sheboygan, WI (US)

(73) Assignee: KOHLER CO.

( * ) Notice: Subject to any disclaimer, the term of this patent is extended or adjusted under 35 U.S.C. 154(b) by 56 days.

(21) Appl. No.: 15/274,782

(22) Filed: Sep. 23, 2016

(65) Prior Publication Data
US 2018/0087416 A1 Mar. 29, 2018

(51) Int. Cl.
| F01M 11/00 | (2006.01) |
| F02B 75/00 | (2006.01) |
| F02B 75/16 | (2006.01) |
| F01M 1/02 | (2006.01) |
| F16F 15/26 | (2006.01) |
| F01M 11/02 | (2006.01) |

(52) U.S. Cl.
CPC ......... F01M 11/0004 (2013.01); F01M 1/02 (2013.01); F01M 11/02 (2013.01); F02B 75/007 (2013.01); F02B 75/16 (2013.01); F16F 15/264 (2013.01); F01M 2011/028 (2013.01)

(58) Field of Classification Search
CPC ......... F01M 11/0004; F01M 2011/005; F01M 2011/0037; F01M 2011/0062; F01M 11/00
See application file for complete search history.

(56) References Cited

U.S. PATENT DOCUMENTS

| 4,938,184 | A |   | 7/1990 | Martin et al. |
| 5,038,890 | A | * | 8/1991 | Tanaka ............... F01M 11/0004 123/196 R |
| 5,113,818 | A | * | 5/1992 | Bonde .................... F01M 11/06 123/195 C |
| 5,901,679 | A |   | 5/1999 | Tanaka et al. |
| 5,937,817 | A |   | 8/1999 | Schanz et al. |
| 6,029,638 | A |   | 2/2000 | Funai et al. |
| 6,041,751 | A |   | 3/2000 | Kuriyama et al. |

(Continued)

FOREIGN PATENT DOCUMENTS

WO 2007096772 8/2007

Primary Examiner — Long T Tran
(74) Attorney, Agent, or Firm — The Belles Group, P.C.

(57) ABSTRACT

An internal combustion engine that includes an oil baffle in the oil sump. The internal combustion engine may include a crankcase comprising an oil sump containing an oil reservoir, a crankshaft, and an oil baffle positioned within the oil sump. The crankshaft may be a vertical crankshaft and a first balance shaft may extend upward from the oil baffle. The crankshaft may be positioned within the oil baffle and a drivetrain may, also optionally, be positioned in the oil baffle. The internal combustion engine may be configured such that the oil reservoir has a first oil level when the internal combustion engine is off and a second oil level when the internal combustion engine is running at normal operating conditions. The first oil level is above a floor of the oil baffle. The second oil level may, also, be above the floor of the oil baffle.

19 Claims, 13 Drawing Sheets

(56) References Cited

U.S. PATENT DOCUMENTS

| | | |
|---|---|---|
| 6,305,339 B1 | 10/2001 | Iwata et al. |
| 6,371,071 B1 | 4/2002 | Iwata |
| 6,471,008 B1 | 10/2002 | Iwata |
| 6,845,743 B1 * | 1/2005 | Bishop ............... F01M 11/0004 |
| | | 123/195 C |
| 6,880,512 B2 | 4/2005 | Hashimoto et al. |
| 7,131,421 B2 | 11/2006 | Masatoshi et al. |
| 7,245,050 B2 | 7/2007 | Iwata et al. |
| 7,350,506 B2 | 4/2008 | Maezureu et al. |
| 7,357,113 B2 | 4/2008 | Obayashi et al. |
| 7,387,101 B2 | 6/2008 | Fujiki et al. |
| 7,631,629 B2 * | 12/2009 | Terada ................... F01M 5/002 |
| | | 123/192.2 |
| 7,748,500 B2 | 6/2010 | Nagano et al. |
| 7,992,534 B2 | 9/2011 | Hashimoto et al. |
| 8,225,755 B2 | 7/2012 | Martinsson et al. |
| 9,109,476 B2 | 8/2015 | Tsunashima et al. |
| 9,376,942 B2 | 6/2016 | Noguchi et al. |
| 2009/0050100 A1 * | 2/2009 | Terada ................... F01M 5/002 |
| | | 123/192.2 |
| 2010/0147253 A1 * | 6/2010 | Burke ................ F01M 11/0004 |
| | | 123/195 C |
| 2015/0204436 A1 | 7/2015 | Mafune et al. |
| 2015/0276056 A1 | 10/2015 | Chiba et al. |
| 2015/0362024 A1 | 12/2015 | Shimazaki et al. |

\* cited by examiner

INTERNAL COMBUSTION ENGINE HAVING OIL BAFFLE

BACKGROUND

Engines are generally known and widely used. Small engines, such as those used in lawn mowers, outboard marine operation, lawn equipment, generators, power washers, snow blowers, and so on, are also known and require lubrication, such as with oil. Small engines typically utilize an oil reservoir that gathers in the oil sump of the crankcase (i.e., the lower portion of the crankcase). It is known that engines, based on their orientation of the crankshaft, can be considered vertical crankshaft engines and horizontal crankshaft engines. Additionally, it is known to drive various components of the internal combustion utilizing a drivetrain that is driven (directly or indirectly) by the rotation of the crankshaft. It also known to utilize balance shafts to counteract forces and other vibrations in the engine that are not inherently balanced.

One problem experienced in certain engines that utilize an oil sump in which moving components are located in or near the oil sump is that the moving components can cause over-aeration of the oil reservoir in the oil sump, thereby causing unacceptable oil pressure drops in the forced oil flow circuit of the engine. The present invention addresses this, and other problems, of internal combustion engines.

BRIEF SUMMARY

The present invention provides a solution to the aforementioned, and other, deficiencies of internal combustion engines by providing an oil baffle in the oil sump.

In one aspect, the invention can be an internal combustion engine comprising: a crankcase comprising an oil sump containing an oil reservoir; a vertical crankshaft rotatable about a first rotational axis; an oil baffle positioned within the oil sump; and a first balance shaft extending upward from the oil baffle, the first balance shaft rotatable about a second rotational axis.

In another aspect, the invention can be an internal combustion engine comprising: a crankcase comprising an oil sump containing an oil reservoir; an oil baffle positioned within the oil sump; and a crankshaft extending through the oil baffle and configured to rotate about a first rotational axis.

In yet another aspect, the invention can be an internal combustion engine comprising: a crankcase comprising an oil sump containing an oil reservoir; an oil baffle positioned within the oil sump; and a drivetrain positioned within a cavity of the oil baffle; and the oil reservoir having a first oil level when the internal combustion engine is off and a second oil level when the internal combustion engine is running at normal operating conditions, wherein the first oil level is above a floor of the oil baffle.

Further areas of applicability of the present invention will become apparent from the detailed description provided hereinafter. It should be understood that the detailed description and specific examples, while indicating an embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
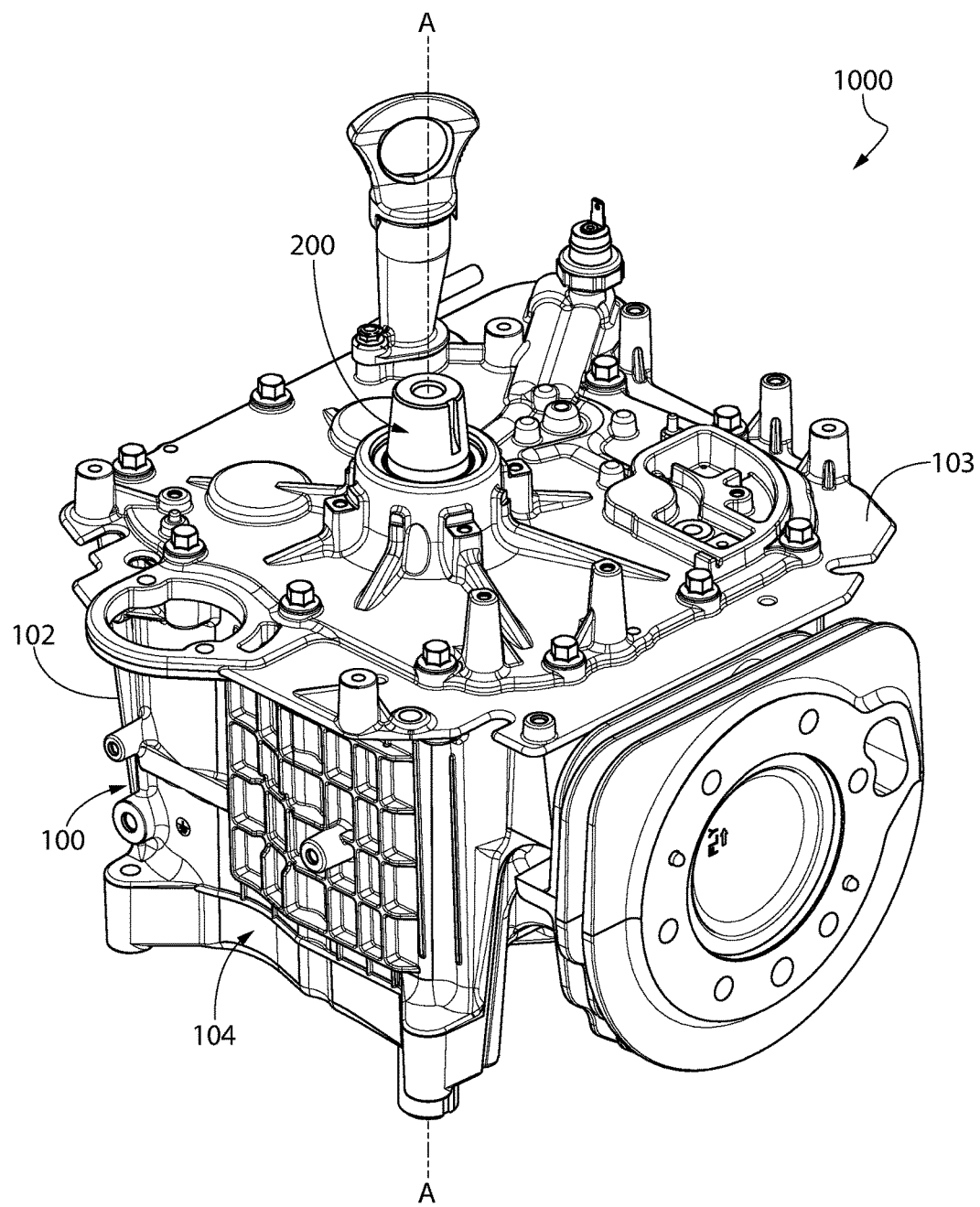
FIG. 1 is a top perspective view of an internal combustion engine according to the present invention.
Figure 2:
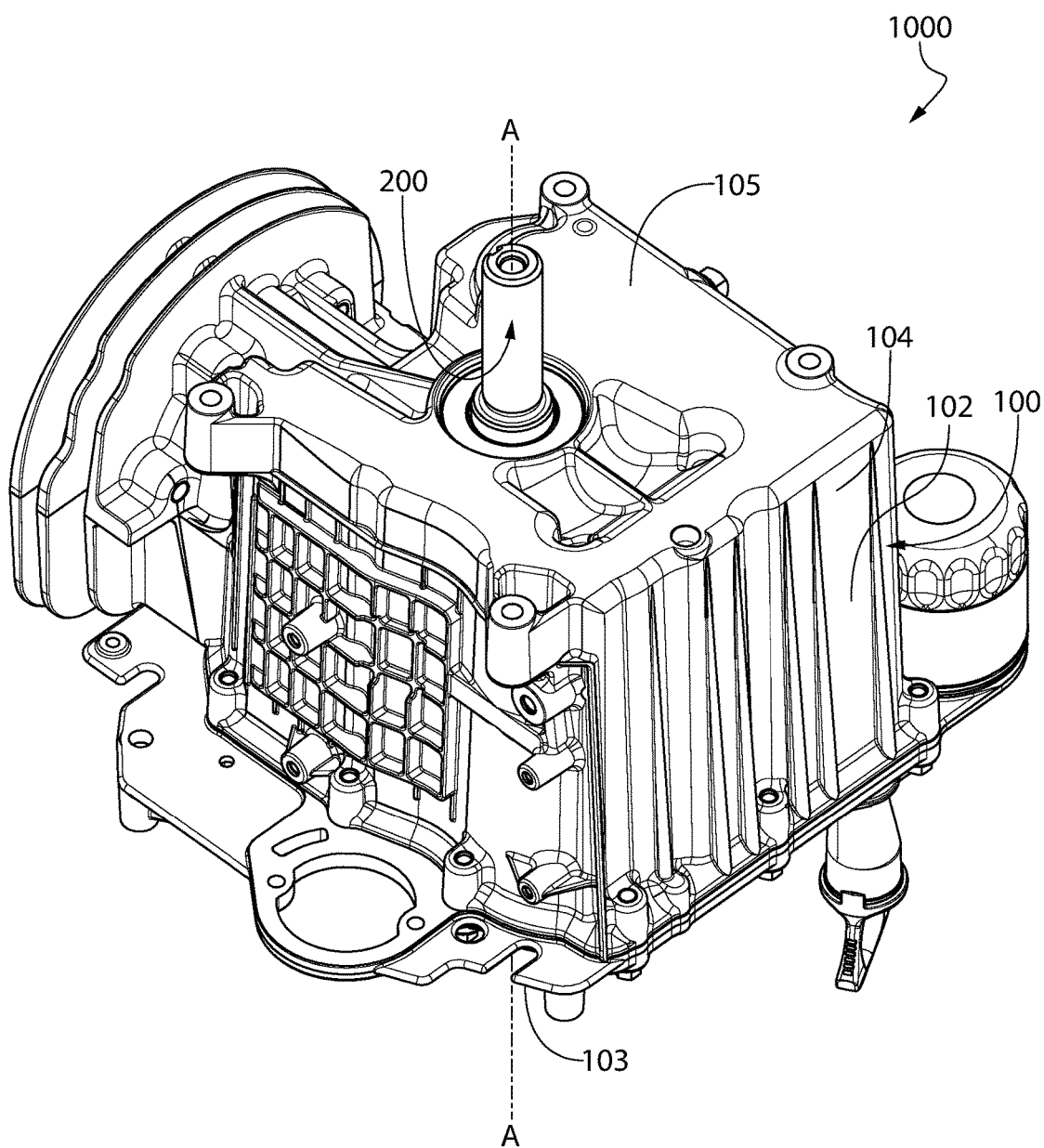
FIG. 2 a bottom perspective view of the internal combustion engine of FIG. 1.
Figure 3:
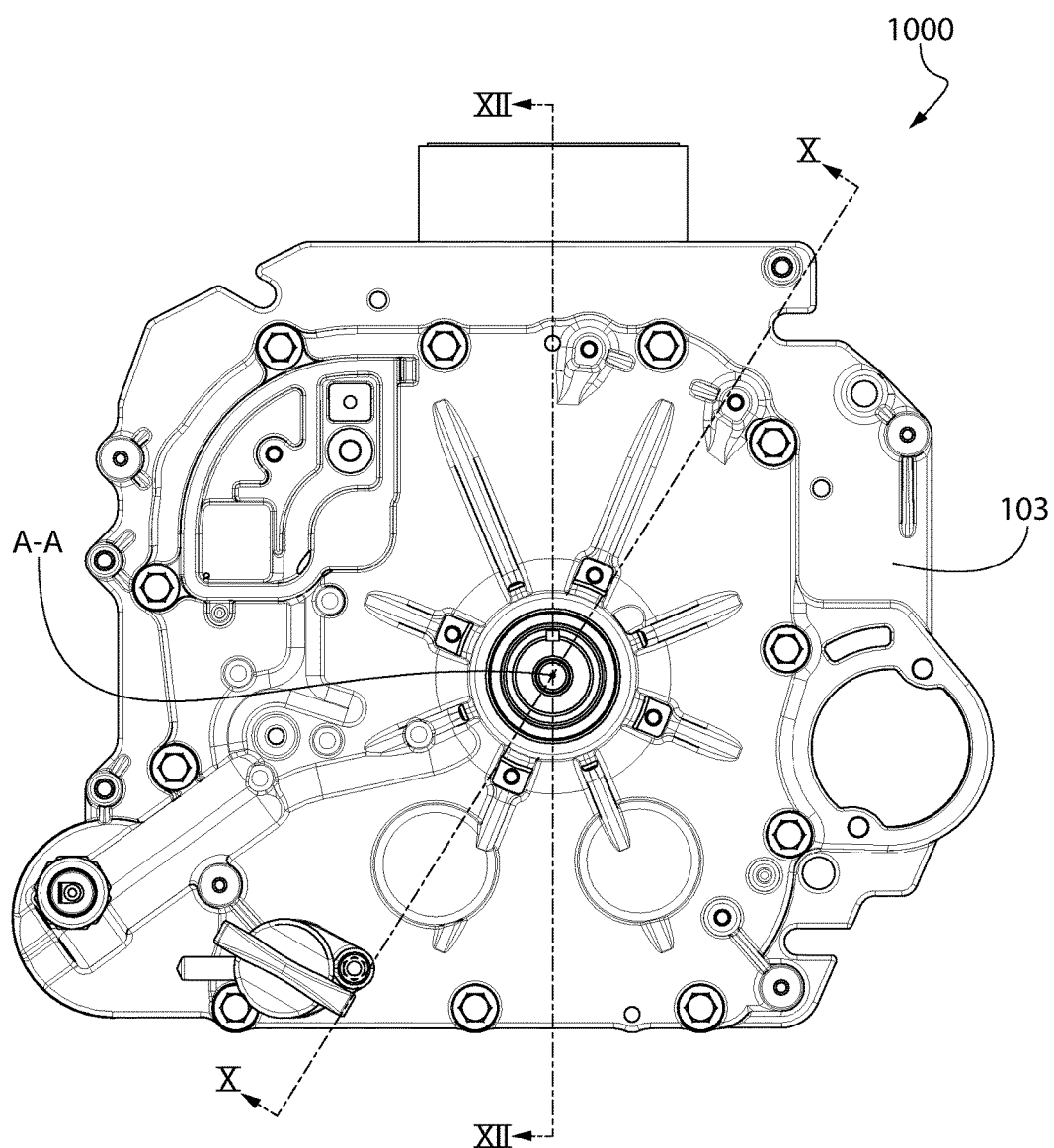
FIG. 3 a top plan view of the internal combustion engine of FIG. 1.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "mounted" and similar refer to a relationship wherein structures are secured or attached to one another either directly or indirectly through intervening structures, as well as both movable or rigid attachments or relationships, unless expressly described otherwise.

Referring to FIGS. 1-3 and 5 concurrently, an internal combustion engine 1000 is illustrated according to the present invention. The internal combustion engine 1000, in the illustrated arrangement, is a small engine, and more specifically, a single-cylinder engine. While the invention will be described herein in relation to the internal combustion engine 1000 in its single-cylinder form, in other arrangements the internal combustion engine 1000 can be a multi-cylinder engine. Additionally, as will become apparent from the below discussion, the internal combustion engine 1000 is a vertical crankshaft engine. However, in other arrangements, the internal combustion engine 1000 may take the form of a horizontal crankshaft engine and, thus, the inventive concepts described herein may be appropriately incorporated therein.

The internal combustion engine 1000 generally comprises a crankcase 100 that defines a housing that encloses a crankcase cavity 101. Various components of the internal combustion engine 1000 are positioned (entirely or partially) within the crankcase cavity 101, as is illustrated and discussed in greater detail. It should be noted, however, that for ease of discussion and to avoid clutter, many components of the internal combustion engine 1000 have either been omitted from the Figures and/or will not be discussed herein. For example, the internal combustion engine 1000 includes the necessary valve mechanisms, connecting rods, piston pins, cylinders, camshaft, cylinder heads, cylinder walls, pistons, piston rings, combustion chamber, etc., as is known to those of skill in the art.

The crankcase 100 comprises a crankcase main body 102 and a top closure plate 103. The top closure plate 103 is coupled to the top end of the crankcase main body 102 and encloses a top end of the crankcase cavity 101. The top closure plate 103 comprises one or more fluid passageways formed therein for delivering oil to various components of the internal combustion engine 1000. The crankcase 100 further comprises an oil sump 104, which forms the lower portion of the crankcase 100 (and the lower portion of the crankcase cavity 101) where oil collects (thereby forming an oil reservoir 700 see FIGS. 12A-B)). As such, the oil sump 104 comprises the floor 105 of the crankcase 100. As illustrated, the oil sump 104 is formed integrally with the crankcase main body 102. However, in other arrangements of the internal combustion engine 1000, the oil sump 104 may be formed as separable component that is coupled to the crankcase main body 104 (i.e., the oil sump 104 may be in the form a traditional oil pan).

The internal combustion engine 1000 comprises a crankshaft 200 and a camshaft 900. The camshaft 800 may include an oil passageway formed therein that forms a portion of the forced flow oil circuit. This oil passageway of the camshaft 900 may be used to deliver oil from the oil pump 800 and deliver to the passageways formed in the top closure plate 103, where the oil is further distributed. The crankshaft 200 protrudes from the top closure plate 103 at the top end of the crankcase 100 and from the oil sump 104 at the bottom end of the crankcase 100. The portion of the crankshaft 200 protruding from the bottom end of the crankcase 100 may be utilized to rotate a workpiece (such as lawnmower blade or other device) while the portion of the crankshaft 200 protruding from the top end of the crankcase 100 may be utilized to rotate a fan or air blower. The crankshaft 200 is operably coupled to and driven by a piston 245 via the piston rod 250. When so driven, the crankshaft 200 rotates about a first rotational axis A-A. As mentioned above, the internal combustion engine 1000 is a vertical crankshaft engine and, thus, the crankshaft 200 is arranged so that the first rotational axis is vertically oriented.

Referring now to FIGS. 4-7 concurrently, the internal combustion engine 1000 further comprises a balance shaft system that is designed to counteract forces and other vibrations in the internal combustion engine 1000 that are not inherently balanced, such as those generated by the piston 245 during operation of the internal combustion engine 1000. The balance shaft system comprises a first balance shaft 300A and a second balance shaft 300B. Each of the first and second balance shafts 300A, 300B are positioned and rotatably mounted within the crankshaft cavity 101. A drivetrain 400 is also provided that operably couples the crankshaft 200 to the balance shaft system to transmit the rotational energy of the crankshaft 200 to rotate each of the first and second balance shafts 300A, 300B (discussed in greater detail below).

The internal combustion engine 1000 further comprises an oil baffle 500 that is positioned within the crankshaft cavity 101. More specifically, the oil baffle 500 is located within the oil sump 104 of the crankcase 100 and mounted therein so that a gap 590 exists between a floor 501 of the oil baffle 500 and the floor 105 of the crankcase 100. As discussed in greater detail below, the drivetrain 400 is located within a cavity 503 of the oil baffle 500. It should, however, be noted that while the drivetrain 400, in the illustrated arrangement, operably couples the crankshaft 200 to the balance shaft system, in other arrangements of the drivetrain 400 may operably couple different components in need of movement/driving. Moreover, the drivetrain 400 may be partially or entirely located within the cavity 503 of the oil baffle 500

Referring now to FIGS. 4, 6, 7, and 10 concurrently, each of the first and second balance shafts extend upward from the oil baffle 500. The first balance shaft 300A is mounted so as to be rotatable about a second rotational axis B-B while the second balance shaft 300B is mounted so as to be rotatable about a third rotational axis C-C. Each of the second and third rotational axes B-B, C-C is substantially parallel to the first rotational axis A-A about which the crankshaft 200 rotates.

The first balance shaft 300A generally comprises a first balance shaft drive gear 301A, a first shaft portion 302A, an upper first offset mass 303A, a lower first offset mass 333A, a first bottom bearing mount portion 304A, and a first top bearing mount portion 305A. Similarly, the second balance shaft 300B generally comprises a second balance shaft drive gear 301B, a second shaft portion 302B, a second upper offset mass 303B, a second lower offset mass 333B, a second bottom bearing mount portion 304B, and a second top bearing mount portion 305B. The rotational phase of the first and second balance shafts 300A, 300B is designed to counteract and equalize the imbalanced forces generated within the internal combustion engine 1000 (such as by the piston 250) utilizing the offset masses 303A-B, 333A-B. While each of the first and second balance shafts 300A, 300B utilize upper and lower offset masses 303A-B, 333A-B, in other arrangements, each of the first and second balance shafts 300A, 300B may include only one offset mass, which may be located anywhere along the first and second balance shafts 300A, 300B.

The drivetrain 400 comprises the first and second balance shaft drive gears 301A, 301B. The drivetrain 400 additionally comprises a crankshaft gear 201, which is operably coupled to the crankshaft 200 for rotation about the first rotational axis A-A. Specifically, rotation of the crankshaft 200 causes rotation of the crankshaft gear 201, which in turn, causes rotation of the first and second balance shaft drive gears 301A, 301B, which in turn cause rotation of the first and second balance shafts 300A, 300B about the second and third rotational axes B-B, C-C respectively. While the drivetrain 400 includes only three gears in the illustrated configuration, in other arrangement more or less gears may be utilized. Additionally, while the drivetrain 400 consists of gears in the illustrated arrangement, in other arrangement the drivetrain 400 may comprises pulleys, belts, bars, and/or other linkage structures that are used to transmit motion (whether it be rotational motion, translational motion, or combinations thereof).

Each of the first and second balance shafts 300A, 300B extend through the oil baffle 500. Specifically, in the illustrated arrangement, each the first and second bottom bearing mount portions 304A, 304B extend through the floor 501 of the oil baffle 500 so as to be operably mounted to first and second balance shaft lower bosses 125A, 125B of the crankcase 100. In certain other arrangements, however, the first and second balance shaft bosses 125A, 125B of the crankcase 100 may extend sufficiently though the oil baffle 500 such that the first and second bottom bearing mount portions 304A, 304B may be located entirely above the floor 501. In such an arrangement, the first and second balance shafts 300A, 300B will still be considered to extend through the oil baffle 500 as the first and second balance shaft lower bosses 125A, 125B may conceptually be considered part of the first and second balance shafts 300A, 300B. The first and second balance shafts 300A, 300B are supported at their upper end through mating between the first and second top bearing mount portions 305A, 305B and first and second balance shaft upper bosses 126A, 126B respectively. Annular ball bearing assemblies (or other bearings or low friction surfaces) are provided as needed to facilitate proper relative rotation between the bottom bearing mount portions 304A, 304B and the first and second balance shaft lower bosses 125A, 125B respectively, and between the first and second top bearing mount portions 305A, 305B and the first and second balance shaft upper bosses 126A, 126B respectively.

Figure 6:
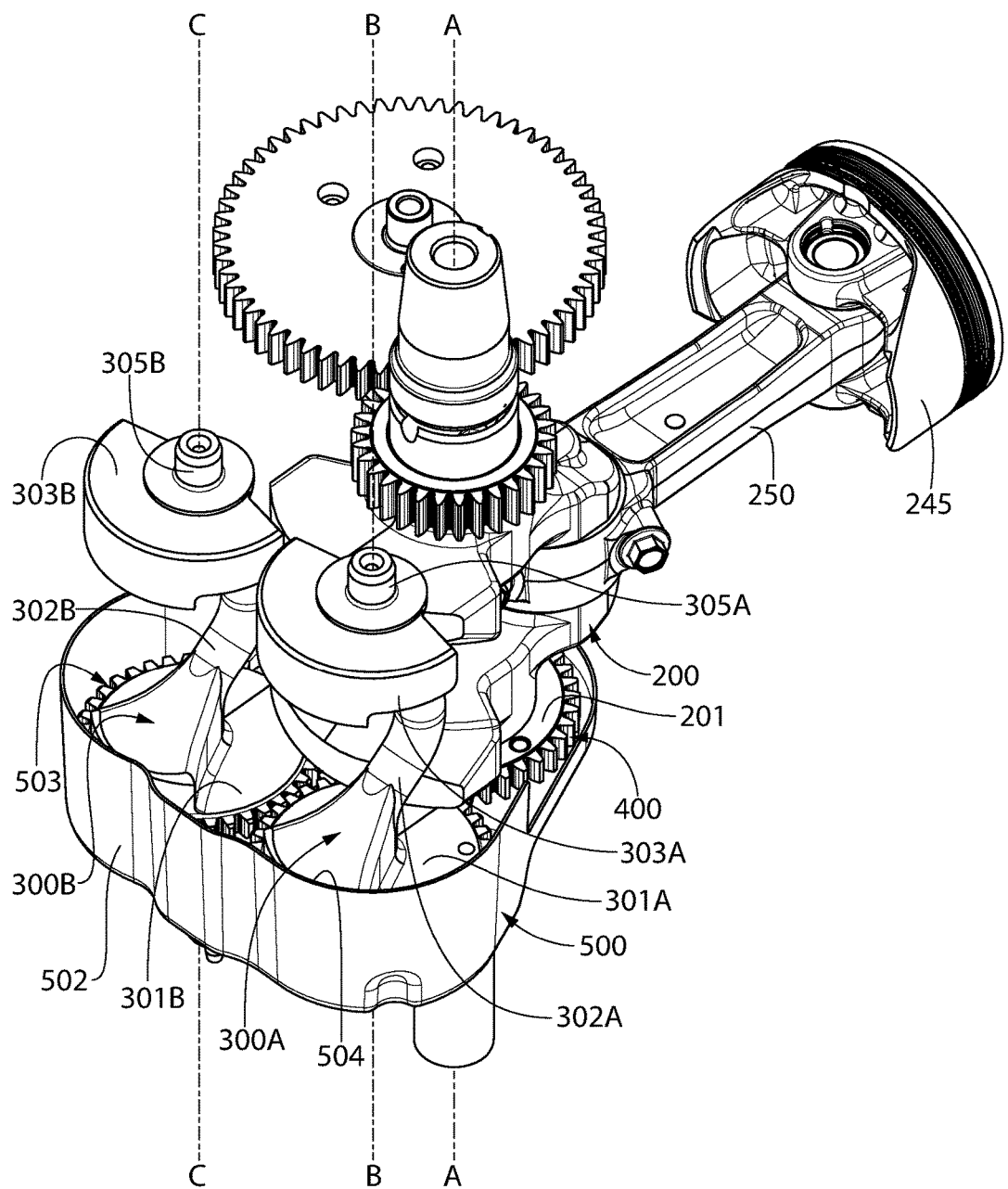
FIG. 6 is a top perspective view of a component assembly of the internal combustion engine of FIG. 1 removed from the crankcase.
Figure 8:
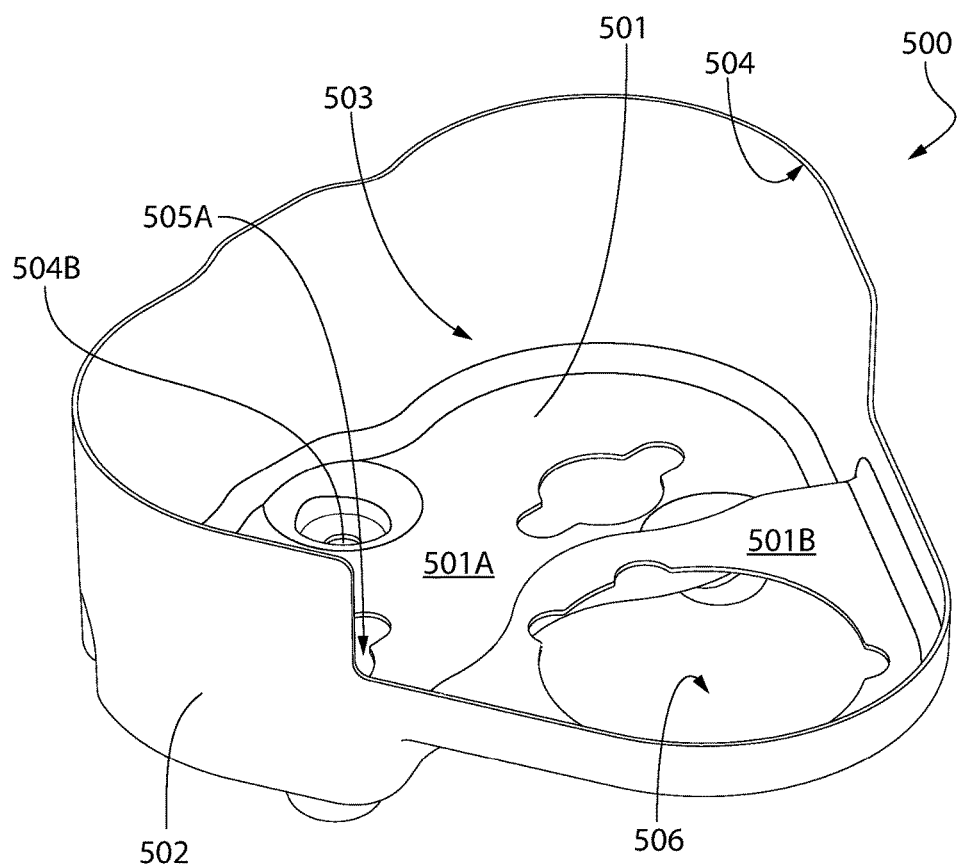
FIG. 8 is a top perspective view of the oil baffle used in the internal combustion engine of FIG. 1.
Figure 9:
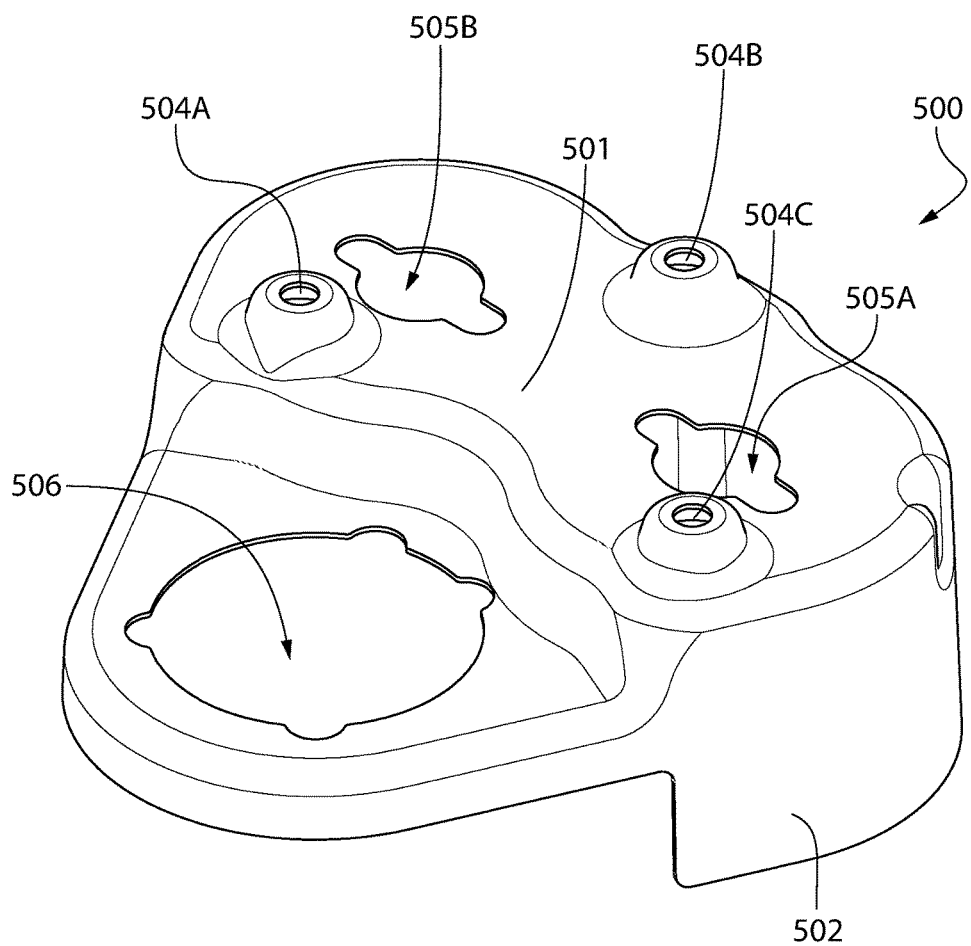
FIG. 9 is a bottom perspective view of the oil baffle of FIG. 8.

Referring now to FIGS. 6, 8 and 9 concurrently, details of the oil baffle 500 will be discussed. The oil baffle 500 generally comprises the floor 501 and an upstanding sidewall 502 extending upward from the floor 501. The floor 501 and the upstanding sidewall 502 form a basin comprising a cavity 503 having an open top end 504. The open top end 504 of the cavity 503 is defined by an upper terminal edge of the upstanding sidewall 502. The upper terminal edge of the upstanding sidewall 502, in the illustrated arrangement, is at a height above the drivetrain 400.

As discussed in greater detail below, the inclusion of the oil baffle 500 in the internal combustion system 1000 helps prevent aeration of the oil in the oil reservoir 700 that is external to the oil baffle 500, thereby preventing oil pressure issues due to entrapped air being drawn into the oil pump 800. The open top end 504 of the cavity 503 of the oil baffle 500, however, at the same time, allows for oil that is being splashed within cavity 503 of the oil baffle 500 to be flung back into the oil reservoir 700 outside of the oil baffle 500. In certain arrangements, oil that is being splashed about the crankcase cavity 101 may be able to enter the oil baffle 500 via the open top end 504 to contact and lubricate the drivetrain 400 during operation of the internal combustion engine 1000. It should be noted, however, that while the oil baffle 500 has an open cavity/open trough configuration in the illustrated embodiment, in other arrangements, the oil baffle 500 may take on the form of a housing that forms an enclosure (that includes the necessary penetrations for the balance shafts 300A-B and crankshaft 200).

The floor 501 of the oil baffle 500, in the illustrated arrangement, is stepped having a lower portion 501A and a raised portion 501B. Mounting holes 504A-C are provided so that the oil baffle 500 can be mounted to the crankcase 100 inside of the crankcase cavity 101 as shown in the other figures. First and second balance shaft apertures 505A, 505B are also provided on the floor 501 and provide the necessary passageways through the first and second balance shafts 300A, 300B extend respectively for mounting to the floor 105 of the crankcase 100. A crankshaft aperture 506 is also provided on the floor 501 and provides the necessary passageway through which the crankshaft 200 extends (discussed below in more detail).

The oil baffle 500 is designed such that when the oil baffle 500 is mounted in position within the crankcase cavity 101, a plurality of oil flow passages 507A-D (see FIG. 11) exist that allow oil to flow therethrough as discussed in greater detail below. These oil flow passages 507A-D, in the illustrated arrangement, are actually clearance gaps that exist between the edges of the floor 501 of the oil baffle 500 that define the balance shaft apertures 505A, 505B and the first and second balance shaft lower bosses 125A, 125B of the crankcase 100. Thus, in one arrangement, the oil flow passages may be annular clearance gaps. The size of the clearance gaps (i.e., the oil flow passages 507A-D are designed to allow oil to flow therethrough). Additional (and similar) oil flow passages may exist as clearance gaps between the floor 501 of the oil baffle 500 and the crankshaft 200 (or about the mounting elements used to mount the oil baffle 500 to the crankcase 100). In still other arrangements, the oil flow passages 507A-D may be formed as independent closed-geometry apertures provided for the sole purpose of allowing oil to pass therethrough. In still other arrangements, the oil flow passages 507A-H may be formed as notches in the floor extending from the balance shaft apertures 505A, 505B and/or the crankshaft aperture 506.

During operation of the internal combustion engine 1000 at normal operating conditions, the oil flow may be upward into the cavity 503 of the oil baffle 500 from the oil of the oil reservoir 700 that is outside of the oil baffle 500. Such oil flowing into the cavity 503 is used to lubricate the lower bearings. The oil flow passages 507A-D may, however, limit the push back of the oil that is trying to get back into the oil baffle 500. Once inside the cavity 503 of the oil baffle 500 during engine operation, the oil may be flung out of the open top end 504 of the cavity 503 of the oil baffle 500 by the rotating shafts 300A-B (or other moving components). Of course, during an actual oil change for maintenance, the oil flow passages 507A-H would allow the oil to drain from the cavity 503 of the oil baffle 500.

Figure 10:
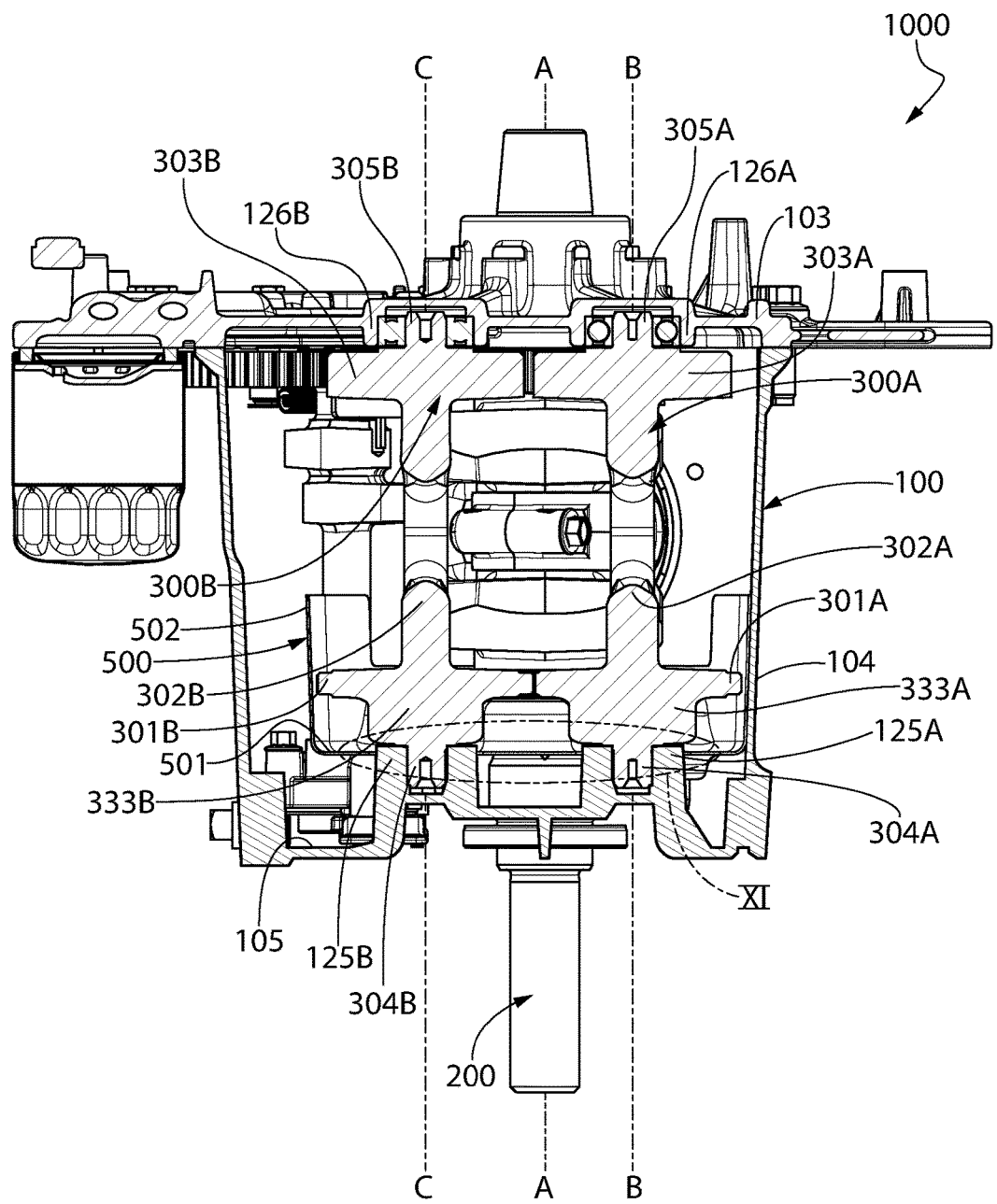
FIG. 10 is a cross-sectional view of the internal combustion engine of FIG. 1 taken along view X-X of FIG. 3.
Figure 11:
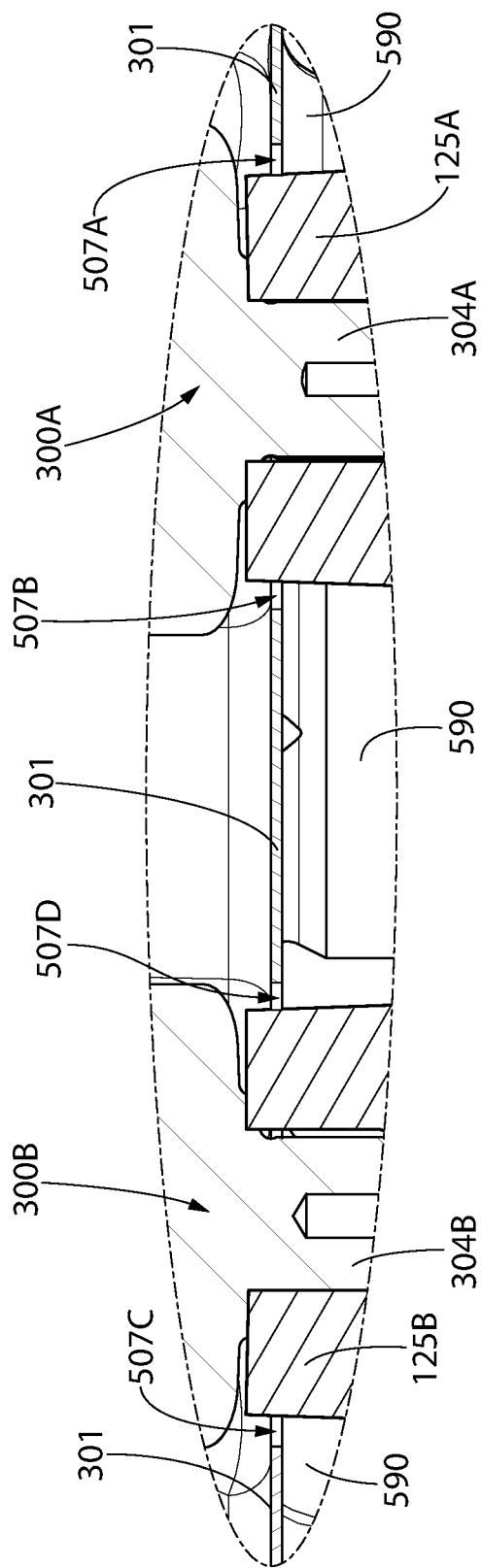
FIG. 11 is a close-up view of area XI-XI of FIG. 10.

Referring now to FIGS. 10 and 11 concurrently, the oil baffle 500 minimizes and/or prevents aeration of the oil in the oil reservoir 700 that is outside of the oil baffle 500. Absent the oil baffle 500, excessive aeration may be caused by churning of oil in the oil reservoir 700 by the first and second balance shafts 300A-B (or the drivetrain 400 or the crankshaft 200). For example, the lower offset masses 333A-B of the first and second balance shafts 300A-B have a high potential for significant churning and, thus aeration, due to their geometry. The oil baffle 500, nonetheless, allows lubrication of the drivetrain 400, the first and second balance shafts 300A, 300B and/or the crankshaft 200 (and associated bearings) by, for example, the lower offset masses 333A-B splashing the oil that is within the cavity 503 of the oil baffle 500, while at the same time preventing excessive aeration of the oil that is drawn into the oil pump 800.

As mentioned above, the oil flow passages 507A-D allow oil to flow between the oil reservoir 700 outside of the oil baffle 500 and the cavity 503 of the oil baffle. For example, during operation of the internal combustion engine 1000 at normal operating conditions, the oil of the oil reservoir 700 that is below the oil baffle 500 (and in gap 590) may be pushed through the oil flow passages 507A-D and into the cavity 503 of the oil baffle 500 (where it is used for lubrication purposes).

Figure 4:
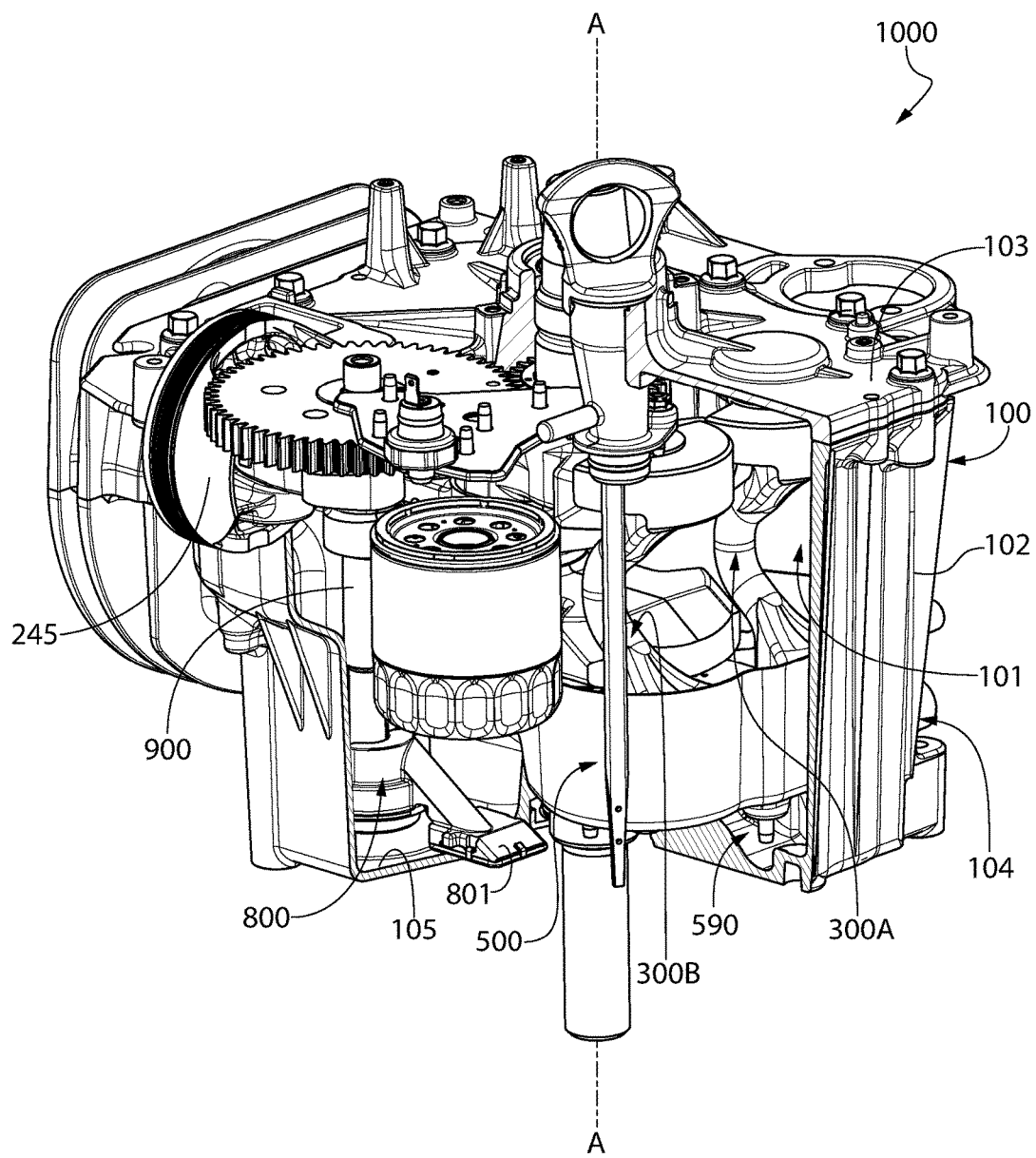
FIG. 4 is a top perspective view of the internal combustion engine of FIG. 1 taken from a first viewing angle with a first portion of the crankcase cutaway.
Figure 5:
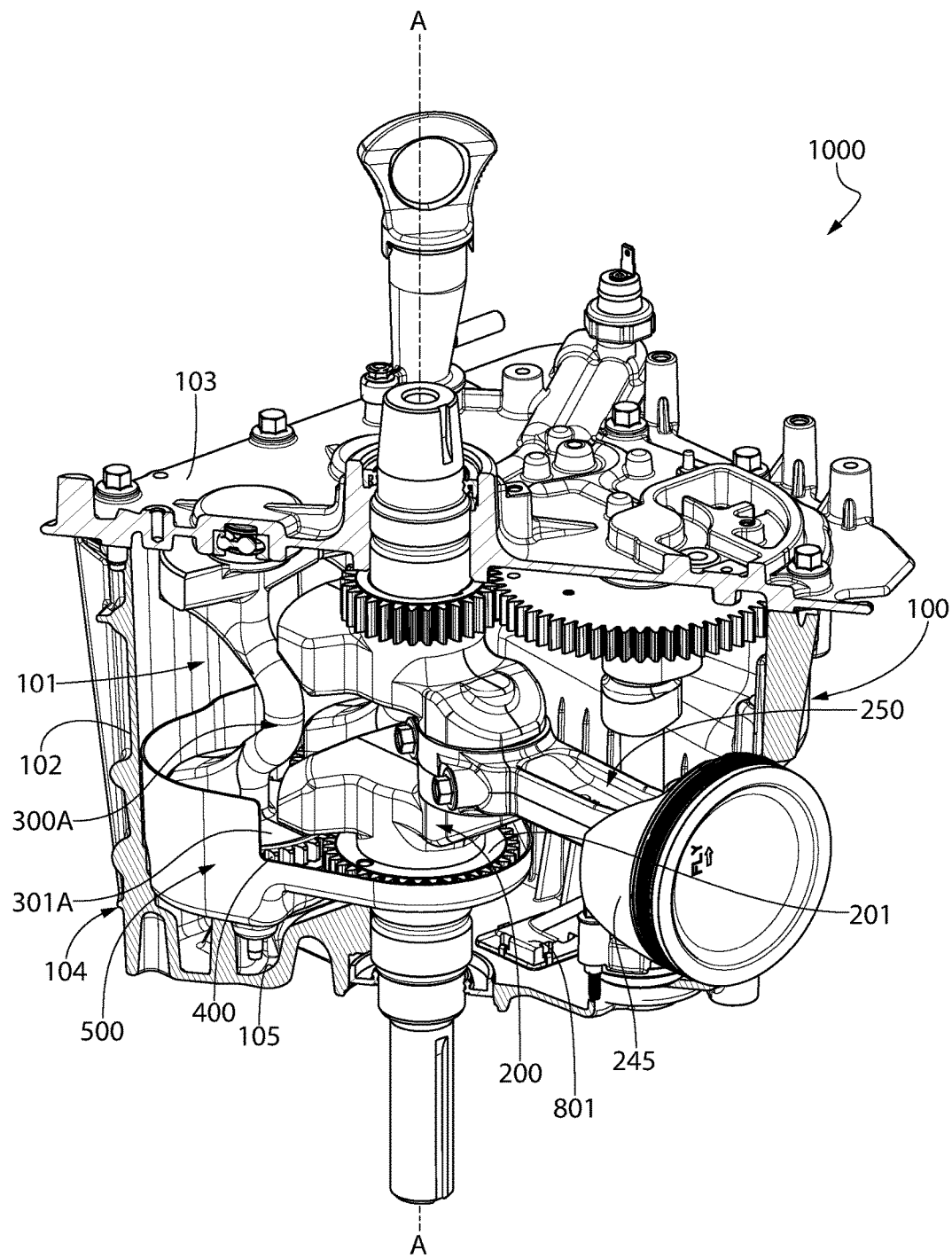
FIG. 5 is a top perspective view of the internal combustion engine of FIG. 1 taken from a second viewing angle with a second portion of the crankcase cutaway.
Figure 7:
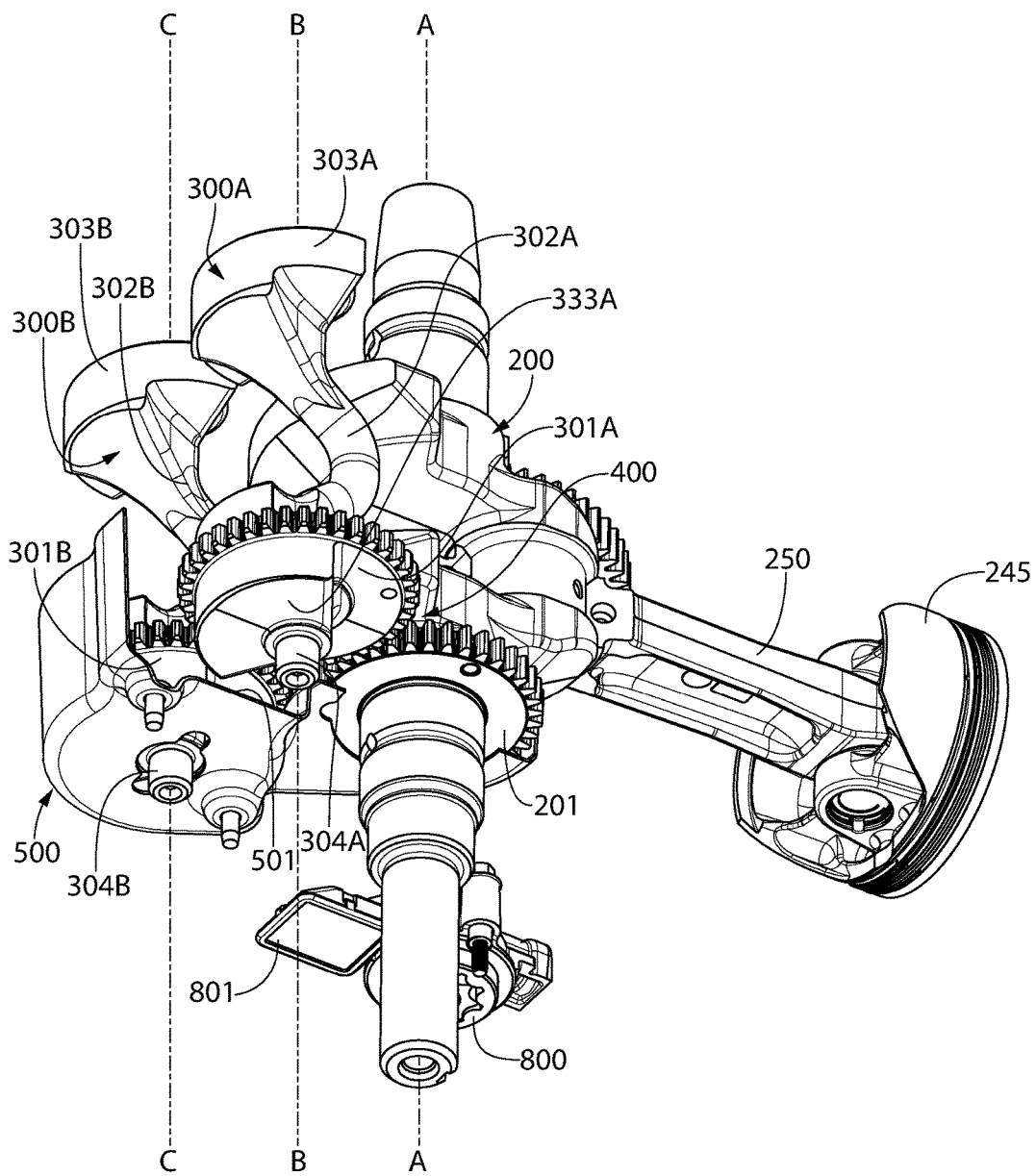
FIG. 7 is a bottom perspective view of the component assembly of FIG. 6 wherein the oil baffle is in partial cutaway.

As a result of the presence of the oil baffle 500, the oil in the oil reservoir 700 outside of the oil baffle 500 experiences a reduced amount of aeration (as compared to when the oil baffle 500 is not present). Without the oil baffle 500 the oil in the oil reservoir 700 would always be churned by the lower offset masses 333A-B of the first and second balance shafts 300A-B, thereby causing excessive aeration. The oil in the oil reservoir 700 outside of the oil baffle 500 is drawn in by the oil pump 800. As shown in FIGS. 4-5 and 7, the oil pump 800 is located in the oil sump 104 and has an oil inlet 801 in fluid communication with the oil reservoir 700 (FIG. 12A) at a location that is external to the oil baffle 300.

Figure 12A:
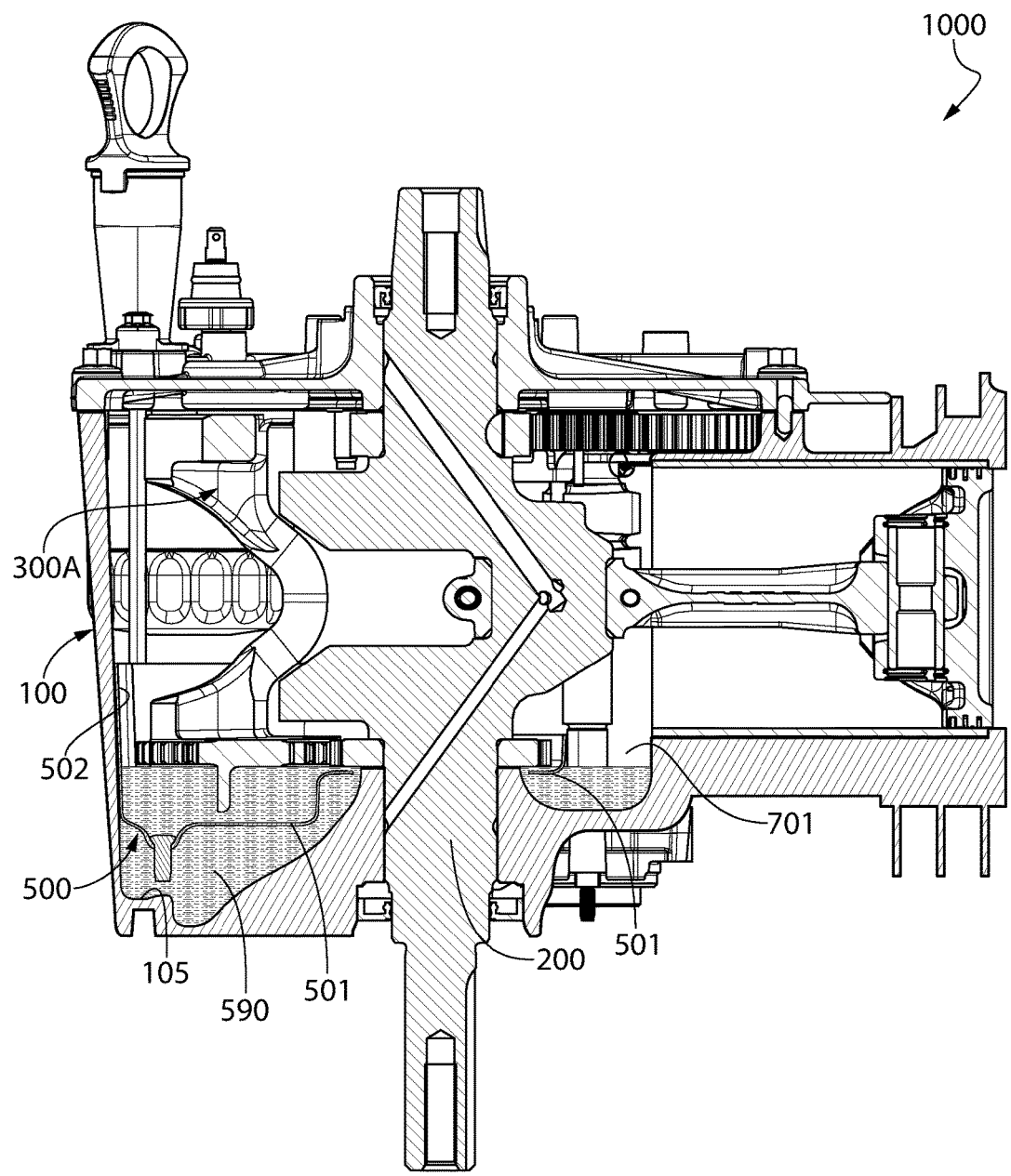
FIG. 12A is a cross-sectional view of the internal combustion engine of FIG. 1 taken along view XII-XII of FIG. 3 and wherein the internal combustion engine is off.
Figure 12B:
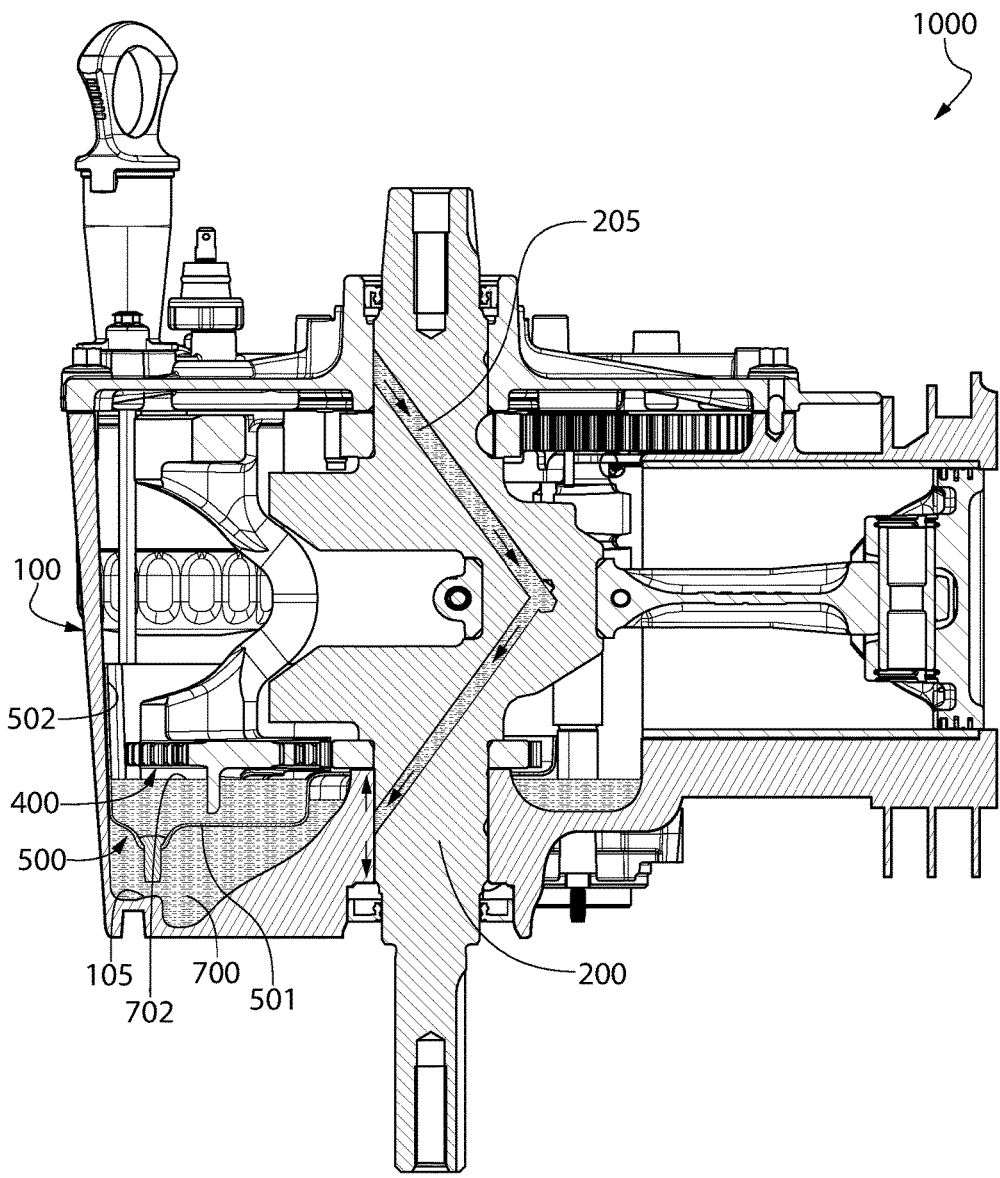
FIG. 12B is a cross-sectional view of the internal combustion engine of FIG. 1 taken along view XII-XII of FIG. 3 and wherein the internal combustion engine is running at normal operating conditions.

Referring now to FIGS. 10 and 12A-B, each of the first and second balance shafts 300A, 300B are located (at least partially) in the cavity 503 of the oil baffle 500 and extend upward from the floor 501 in a vertical direction. More specifically, a lower portion of the first balance shaft 300A is located within the cavity 503 of the oil baffle 500 while an upper portion of the first balance shaft 300A protrudes from the oil baffle 500 via the open top end 504 of the cavity 503. In the illustrated configuration, the lower portion of the first balance shaft 300A (which nests in the cavity 503) comprises the first balance shaft drive gear 301A (and the lower first offset mass 333A) while the upper portion of the first balance shaft 300A comprises the first shaft portion 302A (and the upper first offset mass 333A).

Similarly, a lower portion of the second balance shaft 300B is located within the cavity 503 of the oil baffle 500 while an upper portion of the second balance shaft 300B protrudes from the oil baffle 500 via the open top end 504 of the cavity 503. In the illustrated configuration, the lower portion of the second balance shaft 300B (which nests in the cavity 503) comprises the second balance shaft drive gear 301B (and the lower second offset mass 333B) while the upper portion of the second balance shaft 300B comprises the second shaft portion 302B (and the upper second offset mass 303B).

As can also be seen, the crankshaft 200 extends through the oil baffle 500. Specifically, the crankshaft 200 extends through the floor 501 of the oil baffle 500. Thus, a portion of the crankshaft 200 nests within the cavity 503 of the oil baffle 500. This allows the crankshaft 200 to be used as the operating force of the drivetrain 400 within the cavity 503 of the oil baffle 500 such that aeration of the oil reservoir 700 is minimized and/or eliminated. Additionally, while the illustrated configuration shows the crankshaft 200 driving the balance shaft system utilizing the drivetrain 400, in other arrangements, the drivetrain 400 (which is driven by the crankshaft 200 and located within the cavity 503) can drive other components instead of or addition to the balance shaft system.

As can be seen from FIG. 12A, the oil reservoir 700 has a first oil level 701 when the internal combustion engine 1000 is off. The first oil level 701 is above the floor 501 of the oil baffle 500. Thus, when the internal combustion engine 1000 is off the oil reservoir 700 at least partially fills the cavity 503 of the oil baffle and fills the gap 590 formed between the floor 502 of the oil baffle 500 and the floor 105 of the crankcase. In the illustrated arrangement, the first oil level 701 is above the floor 501 and sufficiently high so as to contact at least a portion of the first and second balance shafts 300A-B (specifically the lower offset masses 333A-B are at least partially submerged). In other arrangements, the first oil level 701 is above the floor 501 and sufficiently high so as to contact at least a portion of the drivetrain 400 (i.e., one or all of the gears 301A, 301B, 201).

Turning now to FIG. 12B, when the internal combustion is turned on and running at normal operating conditions, the oil pump 800 draws oil from the oil reservoir 700 and forces the oil through a forced flow oil circuit where the oil is provided to various parts of the internal combustion engine 1000 that require lubrication. As a result of oil being forced through the oil circuit by the oil pump 800, the oil level of the oil reservoir 700 may decrease and eventually stabilize at a second oil level 702. For example, at start-up, the oil level may be drawn down about a ¼ inch but, as the oil heats up (and picks up some aeration), the oil will then expand and reduce the change/delta between the first and second oil levels to about an ⅛ inch. When at the second oil level 702, the oil level is still above the floor 501 of the oil baffle 500. Thus, the bottom of the oil baffle 500 always has oil pressure against it pushing upwards and some oil flows into the cavity 503 of the oil baffle 500.

Thus, in one arrangement, the second oil level 702 may be lower than the first oil level 701. In some configurations, however, the second oil level 702 may be the same as the first oil level 701. In even another arrangement, the second oil level 702 may be greater than the first oil level 701 (as a result of volumetric expansion due to heating up and acceptable levels of aeration).

As can be seen, in the illustrated arrangement, the crankshaft 200 comprises an oil conduit 205 that forms a portion of the forced flow oil circuit. The oil flows through the system all the way through the oil conduit 205 of the crankshaft 200 where it dead-heads at the lower main. The oil then works its way through the bearing (which is the case with all the bearings in the internal combustion engine 1000). The system is pressurized throughout and the oil is pushed to lubricate all bearings.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. An internal combustion engine comprising:
   a crankcase comprising an oil sump containing an oil reservoir;
   a vertical crankshaft rotatable about a first rotational axis;
   an oil baffle positioned within the oil sump; and
   a first balance shaft extending upward from the oil baffle, the first balance shaft rotatable about a second rotational axis;
   wherein the oil baffle comprises a basin comprising a cavity having an open top end; and wherein a lower portion of the first balance shaft is located within the cavity and an upper portion of the first balance shaft protrudes from the oil baffle via the open top end of the cavity.

2. The internal combustion engine according to claim 1 wherein the lower portion of the first balance shaft comprises a first balance shaft drive gear and a first offset mass; and wherein the upper portion of the first balance shaft comprises a first shaft portion.

3. The internal combustion engine according to claim 1 further comprising:
   a second balance shaft extending upward from the oil baffle, the second balance shaft rotatable about a third rotational axis;
   wherein a lower portion of the second balance shaft is located within the cavity and an upper portion of the second balance shaft protrudes from the oil baffle via the open top end of the cavity; and
   wherein the lower portion of the second balance shaft comprises a second balance shaft drive gear and a second offset mass, and wherein the upper portion of the second balance shaft comprises a second shaft portion.

4. The internal combustion engine according to claim 3 further comprising a crankshaft gear operably coupled to the vertical crankshaft for rotation about the first rotational axis, the crankshaft gear positioned within the cavity of the basin; and the crankshaft gear in operable engagement to rotate each of the first and second balance shaft drive gears.

5. The internal combustion engine according to claim 1 wherein the oil reservoir has a first oil level when the internal combustion engine is off and a second oil level when the internal combustion engine is running at normal operating conditions; and wherein each of the first and second oil levels is above a floor of the oil baffle.

6. The internal combustion engine according to claim 1 wherein the vertical crankshaft extends through the oil baffle.

7. The internal combustion engine according to claim 1 wherein the first balance shaft extends through the oil baffle.

8. The internal combustion engine according to claim 1 wherein the oil baffle comprises an oil flow passage.

9. The internal combustion engine according to claim 8 wherein the oil flow passage is located on a floor of the oil baffle.

10. The internal combustion engine according to claim 1 further comprising an oil pump located in the oil sump, the oil pump having an oil inlet in fluid communication with the oil reservoir at a location external to the oil baffle.

11. An internal combustion engine comprising:
    a crankcase comprising an oil sump containing an oil reservoir;
    an oil baffle positioned within the oil sump; and
    a crankshaft extending through the oil baffle and configured to rotate about a first rotational axis;
    a drivetrain operably coupled to the crankshaft and to at least one additional component of the internal combustion engine;
    the oil baffle comprising a cavity; and
    the drivetrain positioned within the cavity of the oil baffle.

12. The internal combustion engine according to claim 11 wherein the oil baffle comprises a basin forming the cavity, the basin comprising a floor and an upstanding; and wherein the cavity has an open top end.

13. The internal combustion engine according to claim 11 wherein the at least one additional component comprises a first balance shaft, the first balance shaft located at least partially within the cavity of the oil baffle.

14. The internal combustion engine according to claim 11 further comprising an oil pump located in the oil sump, the oil pump having an oil inlet in fluid communication with the oil reservoir at a location external to the oil baffle.

15. The internal combustion engine according to claim 11 wherein the oil baffle comprises an oil flow passage; and wherein the oil baffle is spaced from a floor of the oil sump so that a gap exists between the floor of the oil sump and a floor of the oil baffle.

16. The internal combustion engine according to claim 11 wherein the oil reservoir has a first oil level when the internal combustion engine is off and a second oil level when the internal combustion engine is running at normal operating conditions; and wherein the each of first and second oil levels is above a floor of the oil baffle.

17. An internal combustion engine comprising:
    a crankcase comprising an oil sump containing an oil reservoir;
    an oil baffle positioned within the oil sump; and
    a drivetrain positioned within a cavity of the oil baffle; and
    the oil reservoir having a first oil level when the internal combustion engine is off and a second oil level when the internal combustion engine is running at normal operating conditions, wherein the first oil level is above a floor of the oil baffle.

18. The internal combustion engine according to claim 17 further comprising an oil pump located in the oil sump, the oil pump having an oil inlet in fluid communication with the oil reservoir at a location external to the oil baffle.

19. The internal combustion engine according to claim 17 wherein the second oil level is above the floor of the oil baffle.

* * * * *